United States Patent [19]

Freedman

[11] 4,172,638

[45] Oct. 30, 1979

[54] DUAL MIRROR ARRANGEMENT FOR LIFT TRUCKS

[76] Inventor: Morton A. Freedman, 910 S. Dix Hwy., Detroit, Mich. 48217

[21] Appl. No.: 900,853

[22] Filed: Apr. 28, 1978

[51] Int. Cl.² .............................................. G02B 5/10
[52] U.S. Cl. .................................... 350/302; 350/307
[58] Field of Search ................ 350/301, 302, 307, 293

[56] References Cited

U.S. PATENT DOCUMENTS 1,918,802   7/1933   Fleischer ............................ 350/302

Primary Examiner—F. L. Evans
Attorney, Agent, or Firm—Barnes, Kisselle, Raisch & Choate

[57] ABSTRACT

A pair of mirrors are adjustably mounted at one side of the upright structural frame at the front end of a fork lift truck. One of the mirrors faces forwardly and the other faces rearwardly. The mirrors are adjusted so that the forwardly facing mirror reflects an image of the area directly in front of the truck into the rearwardly facing mirror and is readily visible to the operator.

6 Claims, 6 Drawing Figures

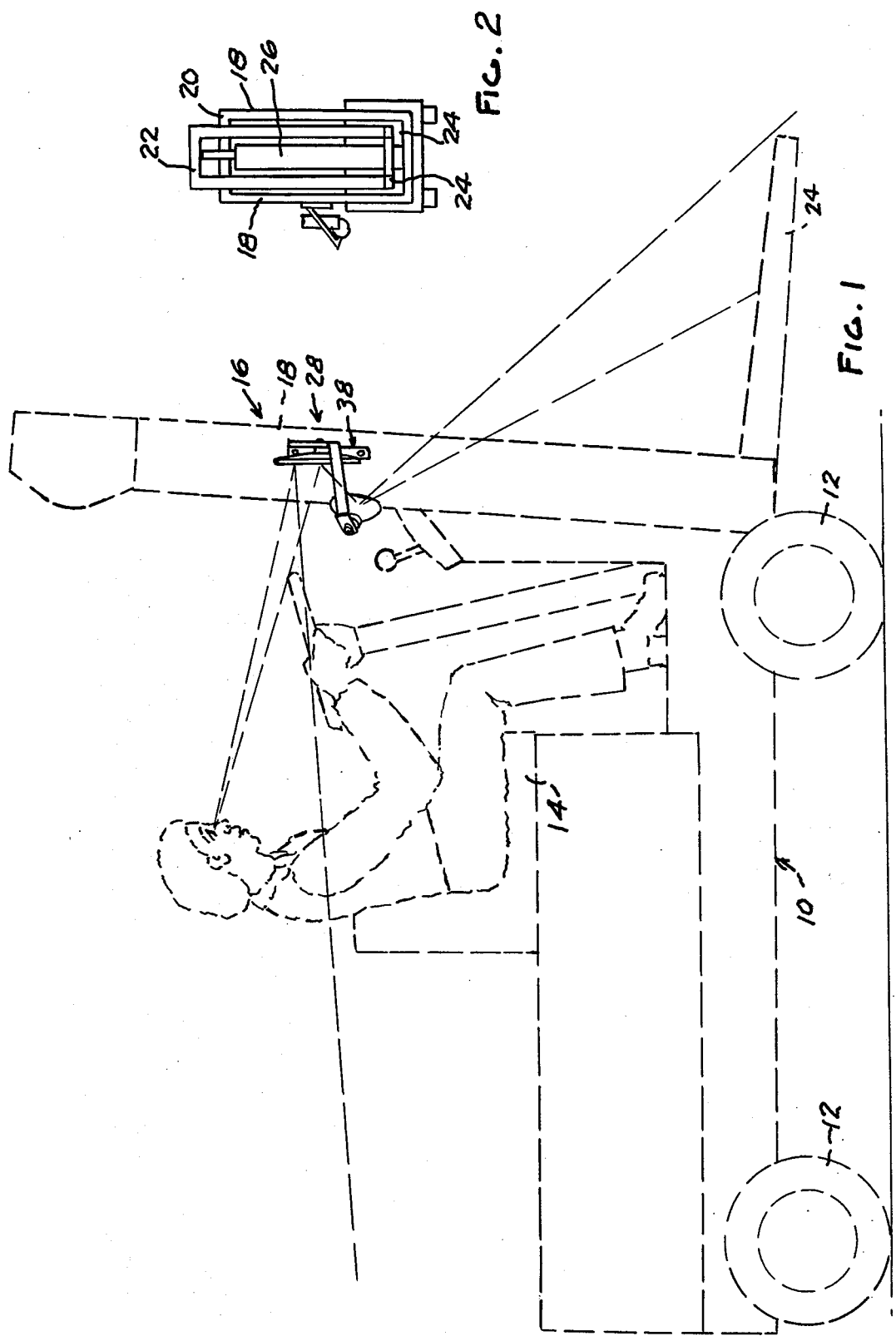

DUAL MIRROR ARRANGEMENT FOR LIFT TRUCKS

This invention relates to fork lift trucks, and, more particularly, to a mirror attachment for such trucks.

Fork lift trucks of conventional design have, by necessity, a relatively wide upright framework at the front end thereof. This framework normally includes a stationary frame on which is mounted a vertically sliding frame. The tines of the fork lift project forwardly from the lower end of the vertically movable frame and an upright hydraulic cylinder interconnects the two frames by suitable means for raising and lowering the tines of the fork.

The operator of the truck is seated directly behind this upright framework structure, and, consequently, his view of the area directly in front of the truck, and particularly the area of the fork lift tines, is severely obstructed. Frequently it is extremely difficult for the operator to manipulate the truck to properly align the tines with the load to be picked up. Likewise, from the standpoint of safety, a possibly dangerous situation is sometimes encountered because of the obstructed view of the operator.

The primary object of this invention is to provide a mirror attachment for lift trucks which eliminates the practical and safety problem resulting from the operator's obstructed view.

More specifically, the invention comprises a bracket adapted to be mounted on one side of the structural frame at the front end of the lift truck, the bracket having pairs of oppositely facing mirrors mounted thereon with a universal pivot connection for each mirror. The bracket is adapted to be adjusted vertically on the structural framework and the mirrors are arranged to be adjusted on the bracket so that the forwardly facing mirror reflects into the rearwardly facing mirror an image of the area directly in front of the truck and this reflected image on the rearwardly facing mirror is clearly visible to the operator.

Other objects, features and advantages of the present invention will become apparent from the following description and accompanying drawings, in which:

FIG. 1 is a side elevational view of a fork lift truck having a mirror arrangement of the present invention mounted thereon;

FIG. 2 is a front end view on a reduced scale of the truck illustrated in FIG. 1;

Figure 4:
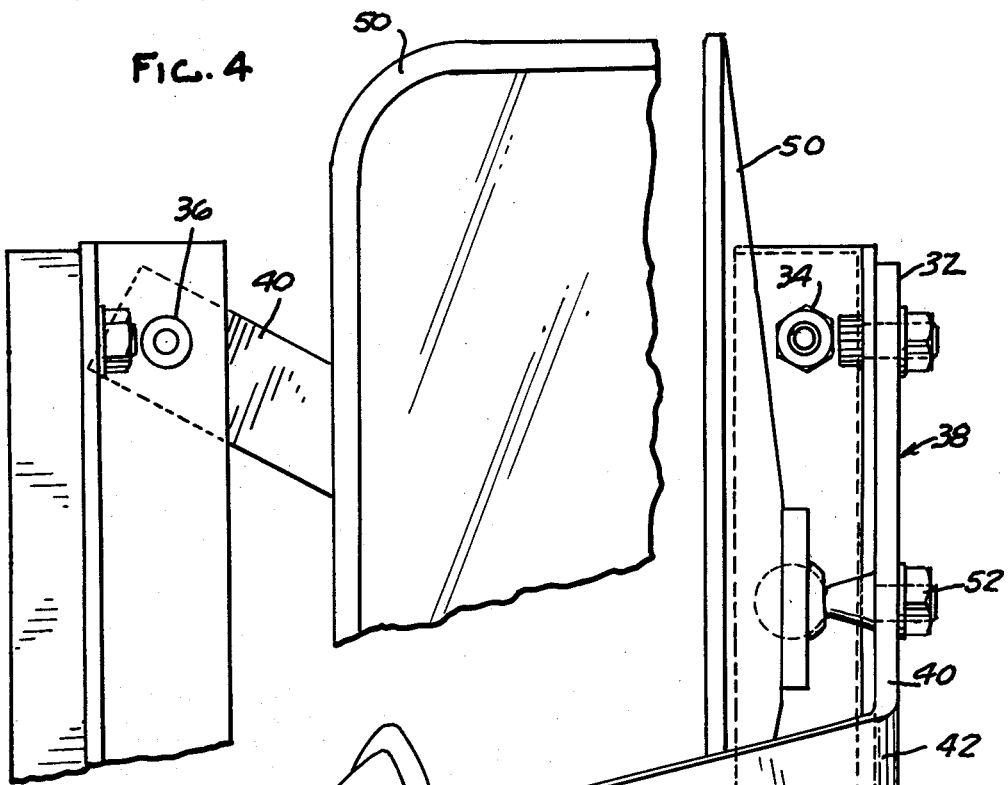
FIG. 4 is a fragmentary elevational view of one of the mirrors and the bracket which supports it on the magnet base.

Referring to FIGS. 1 and 2, a fork lift truck 10 is provided with wheels 12, a forwardly facing vehicle seat 14 and a generally rectangular, vertically-extending framework 16 at the front end thereof. Framework 16 normally comprises a generally fixed frame having upright pillars 18 at each side thereof connected at their upper ends by a cross bar 20. A vertically movable frame 22 is mounted on the fixed frame and has a pair of fork lift tines 24 at the lower end thereof. Frame 22 is adapted to be raised and lowered by means of a hydraulic cylinder 26 positioned in a generally central upright position. On most fork lift trucks arrangement of the stationary frame with the vertical side pillars 18, the movable frame 22 and the hydraulic cylinder 26, together with other components associated with the lifting mechanism severely obstruct the view of the operator in front of the lift truck.

Figure 3:
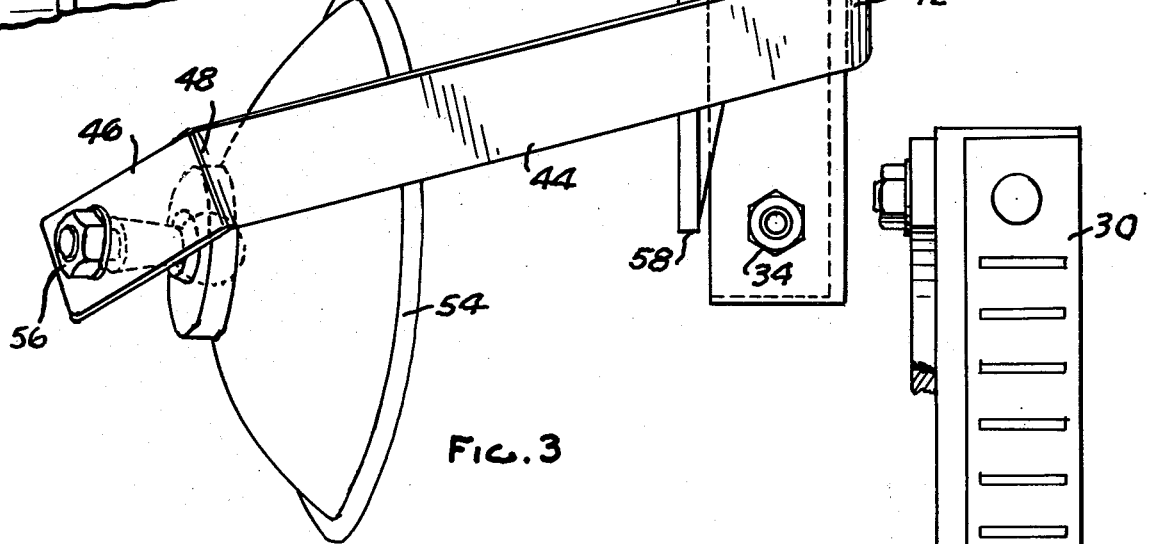
FIG. 3 is a side view of the mirror arrangement.
Figure 6:
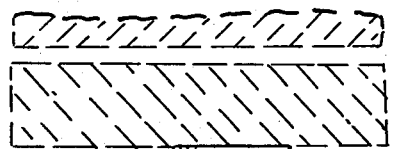
FIG. 6 is a fragmentary detailed view showing the magnet base attached to the structural frame member of the fork lift truck.
Figure 5:
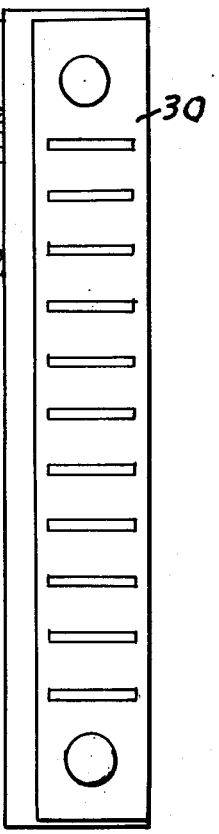
FIG. 5 is a bottom view of the magnet base.

In accordance with the present invention there is mounted on one of the side pillars 18 a mirror assembly 28. This assembly comprises a magnet base 30 which is adapted to be magnetically adherred to the laterally outer face of one of the upright columns 18. An angle iron bracket 32 is secured as by screws 34 to the face of base 30 opposite the magnet base thereof. Bracket 32 in turn has mounted thereon, as by a screw 36, an arm 38 which can be pivotally adjusted to a desired fixed position. Arm 38 has a first straight portion 40 connected by a bend 42 with a second arm portion 44. Arm portion 44 is disposed generally perpendicular to the vertical plane of arm portion 40 and extends downwardly therefrom at an angle of about 20° as shown in FIG. 3. Arm 38 includes a third portion 46 disposed at an angle of about 45° to the plane of arm portion 44 and which is connected thereto by a bend 48. Thus, the arm portions 44,46 are inclined downwardly from the lower end of arm portion 40, and arm portion 46 is inclined away from the plane of arm portion 40 at an angle of about 45°.

A vertically elongated, flat mirror 50 is mounted on arm portion 40 by a universal swivel fitting 52 and a round convex mirror 54 is mounted on arm portion 46 by a universal swivel fitting 56. Fitting 52 is located somewhat below the central portion of mirror 50 on the rear face thereof while swivel fitting 56 is connected to the rear face of mirror 54 at the center thereof.

The particular mirror arrangement described is admirably adapted to overcome a problem of the obstructed view of the vehicle operator by reason of the frame structure at the front end of the vehicle. The mirror assembly can be magnetically adherred to the laterally outer face of one of the upright pillars 18, preferably the righthand side of the truck. The particular shape of arm 38 enables the two mirrors 50,54 to be swivelled on their respective arm portions so that the vehicle operator can observe in mirror 50 an image of the area directly ahead of the truck, including the area occupied by the fork lift tines 24. Since mirror 54 is swivelled on arm portion 46 it is a simple matter to adjust this mirror so that it picks up an image of the area directly in front of the lift truck. This is facilitated by the fact that arm portion 46 is inclined at an angle of about 45° to the longitudinal axis of the lift truck. The particular area in front of the truck to be observed can be readily changed by tilting mirror 54 either vertically or laterally about its swivel connection with fitting 56. The convex face of mirror 54 assures a wide angle of view. Since mirror 50 is vertically elongated and extends upwardly above mirror 54, it is a simple matter to adjust mirror 50 so as to reflect back to the operator the image received by mirror 54. Thus, the operator sees in mirror 50 the entire image picked up by mirror 54.

When the operator of the lift truck is desirous of observing the tines 24 in the lowered position, the mirrors are adjusted to the position generally shown in FIG. 1. There are times, of course, when the operator has lifted a particular load with tines 24 and is desirous of observing an elevated location, such as a storage bin, that is located forwardly and, perhaps, slightly upwardly above frame 22. Under such circumstances the operator may simply rotate mirror 50 180° so that the swivel fitting 52 is disposed closer to the upper edge of the mirror rather than its lower edge. Rotation of mirror 50 to 180° is permitted by reason of the fact that the distance between the axis of fitting 52 and the edge 58 of mirror 50 is at least slightly greater than the distance between the axis of fitting 52 and bend 42. Thus, by mounting mirror 50 on arm portion 40 in a vertically off-center position so that the mirror can be rotated through 180°, the desired adjustment of the mirror can be readily accomplished. When the mirrors are adjusted to pick up an image of the tines in the lower position, the mirrors are adjusted in the manner illustrated in FIGS. 1 and 3 so that the lower edge of mirror 50 is not interferred with the image picked up by mirror 54. Then, when mirror 50 is rotated through 180° from the position shown in FIG. 3 and it is desired to view an elevated area just ahead of frame 22, edge 58 (now the upper edge of the mirror) does not interfere with the image picked up by mirror 54. Under normal circumstances the arm portion 40 is pivotally adjusted to the downwardly inclined position shown in FIG. 4. It will be appreciated, however, that screw 36 can be loosened to permit swinging of arm 38 in a vertical plane to any desired position.

I claim:

1. In combination a fork lift truck having a vertically extending frame at the front end thereof, said frame extending laterally outwardly beyond and vertically upwardly above the vehicle operator seated directly behind said frame so as to obstruct the frontal view of the operator, a pair of forwardly projecting tines mounted for vertical movement on said frame, said frame including upright frame members at the laterally opposite outer sides thereof, a bracket supported on one of said frame members and having an arm extending laterally outwardly and downwardly from said frame member, said arm having a first portion extending laterally outwardly from said one frame member generally transversely of the longitudinal axis of the truck, a second portion extending from the outer end of the first portion in a direction rearwardly of the truck and a third portion extending from the rear end of the second portion in a direction inwardly of the truck, said third portion terminating at its free end laterally outwardly and below the inner end of said first portion, a rearwardly facing mirror mounted on said first arm portion intermediate its ends, a forwardly facing mirror mounted on said third arm portion adjacent the free end thereof at a level below the rearwardly facing mirror, said mirrors being mounted on said arm portions for universal pivotal movement.

2. The combination set forth in claim 1 wherein said arm comprises a one piece metal strip bent into generally U shape.

3. The combination set forth in claim 1 wherein each of said arm portions inclines in a downwardly direction.

4. The combination set forth in claim 3 wherein said third arm portion is inclined downwardly in a rearward direction and inwardly toward the vehicle at an angle of about 45° from the rear end of the second arm portion.

5. The combination set forth in claim 1 wherein said bracket has a magnet base adapted to magnetically adhere to said frame member for adjustable positioning thereon.

6. The combination set forth in claim 1 wherein said rearwardly facing mirror is vertically elongated and said forwardly facing mirror has a convex face.

* * * * *